Jan. 1, 1929.  
L. B. NEIGHBOUR  
MANURE SPREADER  
Filed June 14, 1926  
1,697,285  
3 Sheets-Sheet 1
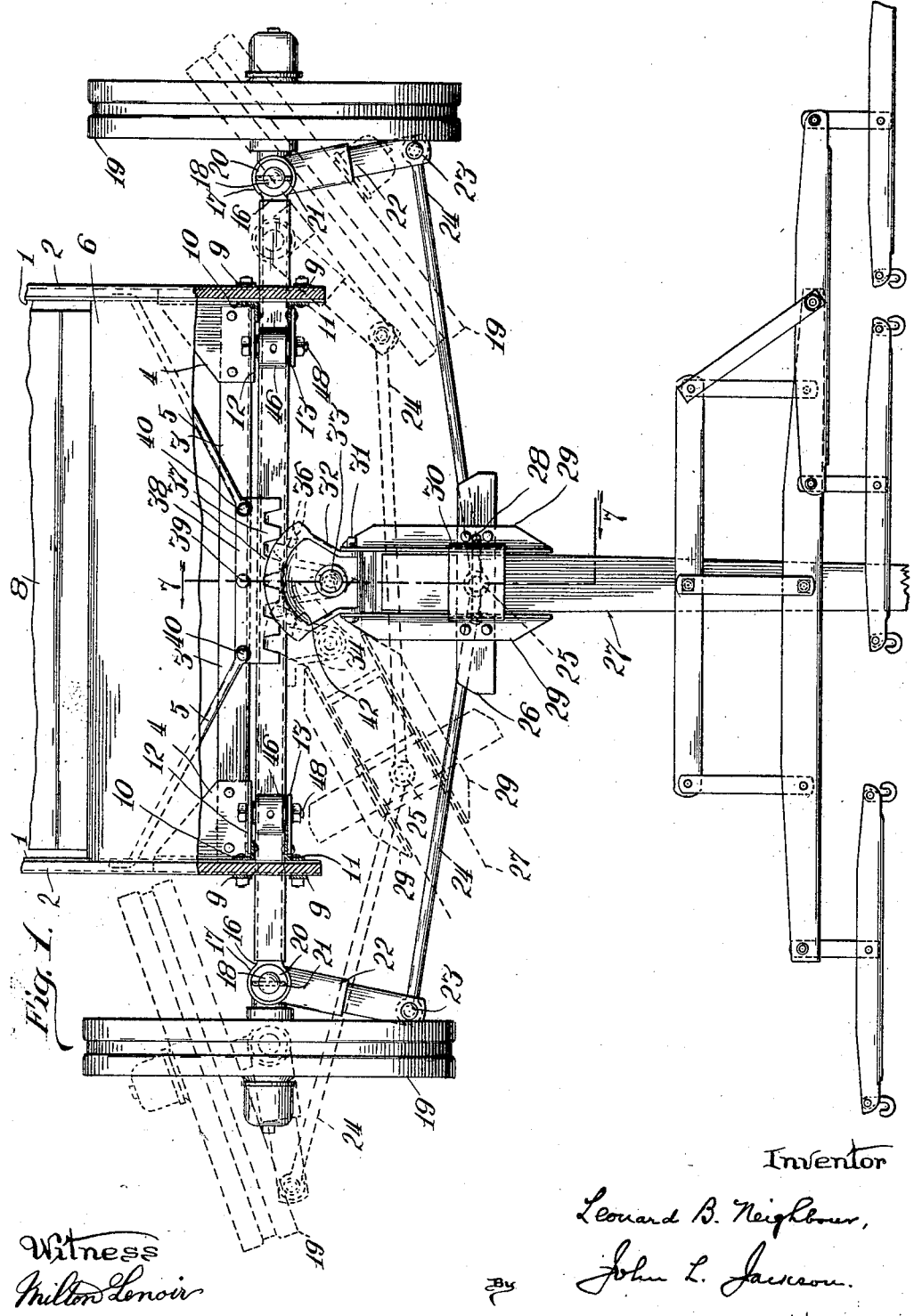
Inventor
Leonard B. Neighbour,
John L. Jackson.
Attorney
Witness
Milton Lenoir

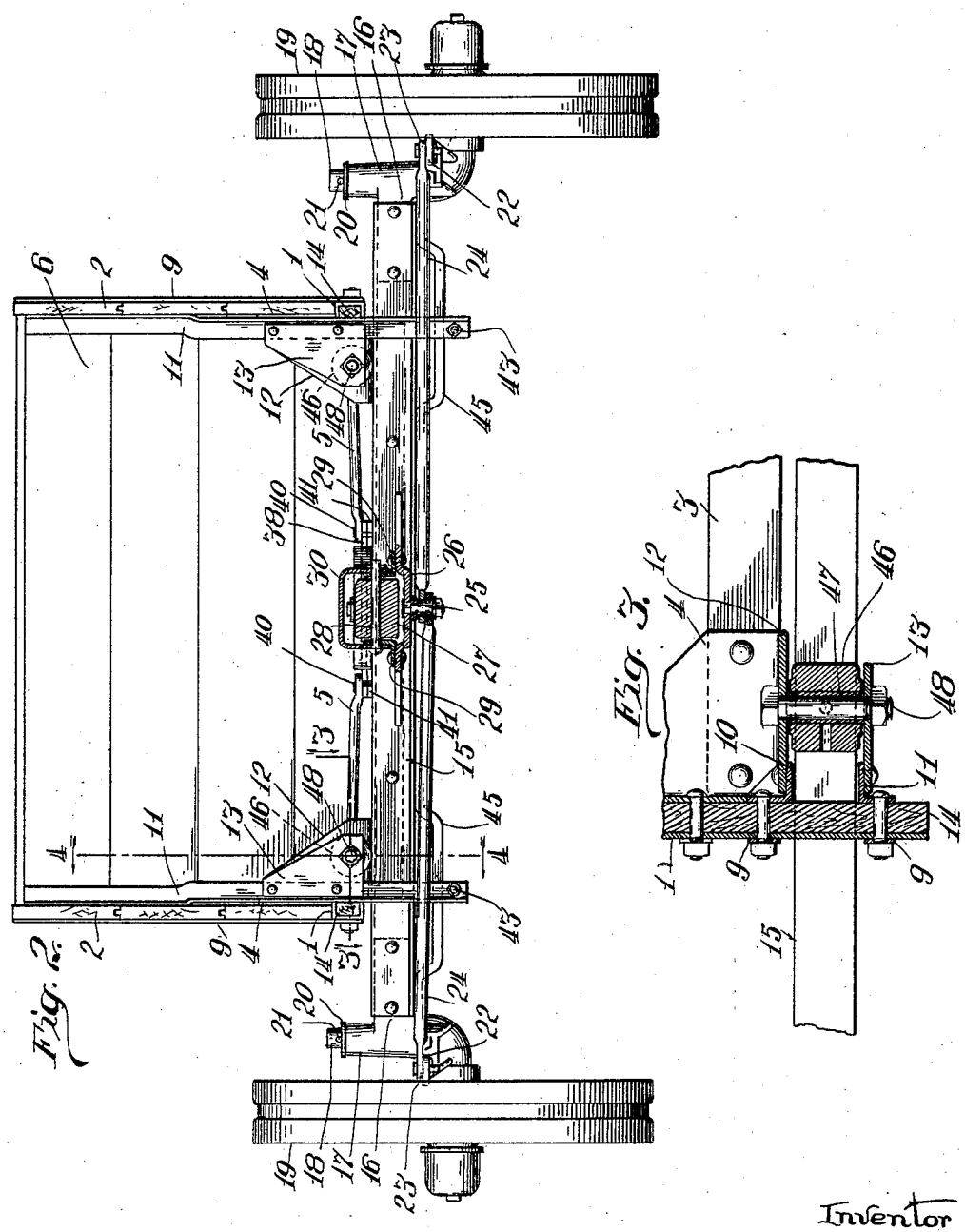

Jan. 1, 1929.
L. B. NEIGHBOUR
MANURE SPREADER
Filed June 14, 1926
1,697,285
3 Sheets-Sheet 3
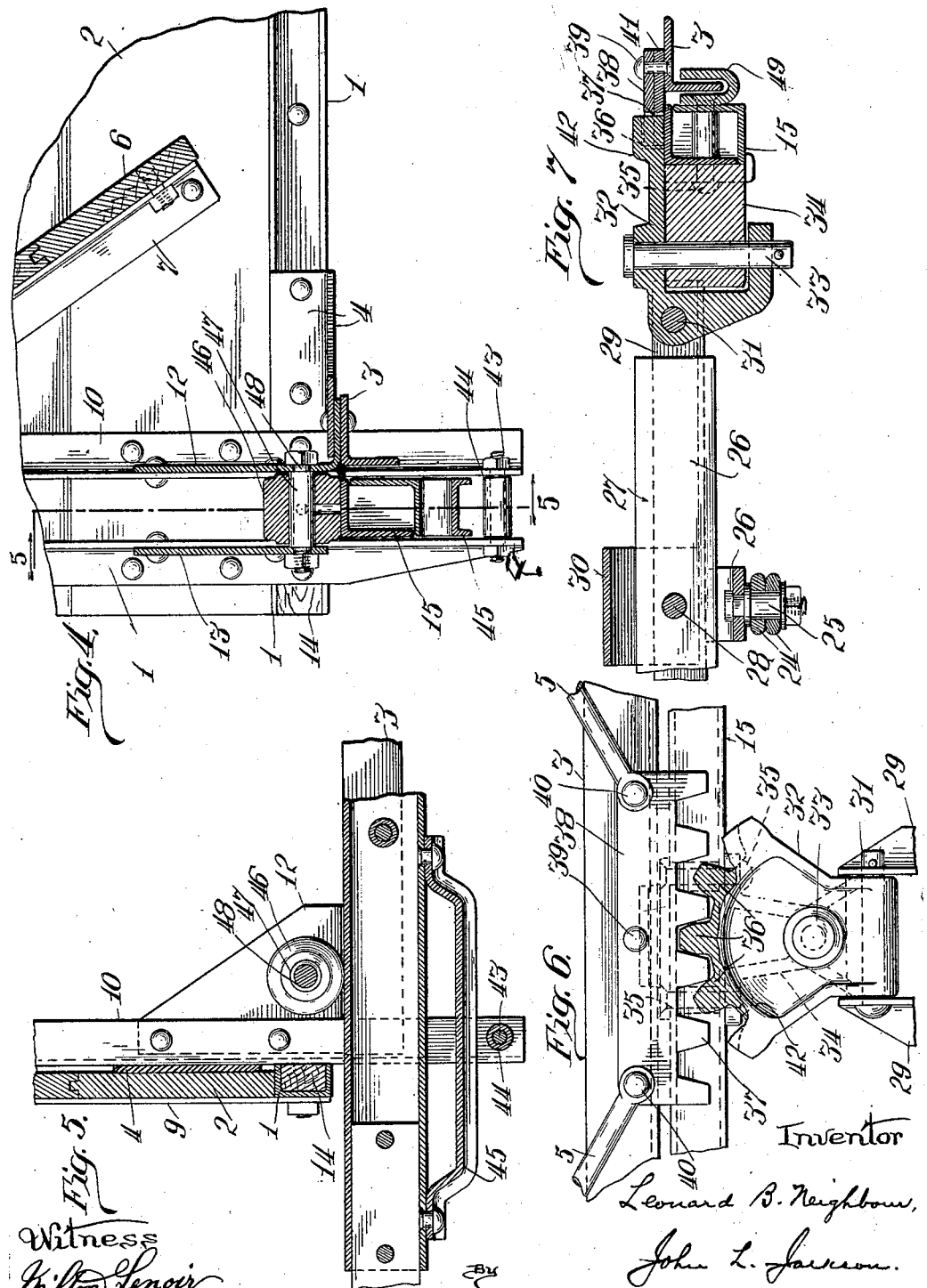

Patented Jan. 1, 1929.

1,697,285

UNITED STATES PATENT OFFICE.

LEONARD B. NEIGHBOUR, OF MOLINE, ILLINOIS, ASSIGNOR TO DEERE & COMPANY, OF MOLINE, ILLINOIS, A CORPORATION OF ILLINOIS.

MANURE SPREADER.

Application filed June 14, 1926. Serial No. 115,756.

My invention relates to manure spreaders of the type comprising a bed adapted to contain the manure, that is mounted on wheels and is provided at the rear with manure delivering and distributing devices to which the manure is fed by a traveling apron that constitutes the bottom of the bed. This invention, however, is not concerned with the particular means used for delivering the manure or with the devices by which the manure is supplied to such delivering means, and, therefore, it should be understood that such devices may be of any approved construction.

In using manure spreaders it is often desirable to make comparatively short turns in order to drive through gates in barn lots, or into corners where the spreader can be conveniently loaded with the manure to be distributed; also in distributing the load in the field it is frequently necessary to turn sharply at corners or at the ends of the field. To permit the taking of such comparatively short turns the usual practice heretofore has been to construct the front portion of the bed or body so that the front wheels can "cut under" the bed when sharp turns are being made, but such an arrangement is objectionable because it is expensive and a considerable portion of the load carrying space in the bed is necessarily sacrificed; besides such an arrangement throws a disproportionate part of the load on the rear wheels. If the front wheels be spaced far enough apart to permit of short turns being made without cutting under the body, an unusually long front axle is required, which increases the cost of manufacture, and reduces the efficiency of the spreader by making it more difficult to handle, as well as interfering with its being driven through narrow gates or along narrow roadways.

The object of my present invention is to provide an improved construction by which the spreader will be made capable of making comparatively short turns without cramping the wheels against the bed, while at the same time the capacity of the bed will not be reduced, the weight of the load will be properly distributed between the front and rear wheels, and the front wheels will be spaced the proper distance apart for the best results. To this end my invention consists generically in providing means by which when the front wheels are turned in steering, the front portion of the bed is automatically shifted laterally with respect to such wheels in a direction away from that in which the turn is being made, to such an extent as to prevent the rear portion of the front wheel on the inner side of the turn from coming in contact with the bed, or in other words being cramped against the bed. As the rear portion of the front wheel at the outer side of the turn always moves outward, or away from the bed, and the front portion of such wheel always lies in advance of the front end of the bed, cramping cannot occur at that side, notwithstanding such lateral movement of the bed. My invention is best embodied in a spreader provided with front wheels of the automobile type,—that is to say, wheels mounted on upright spindles journaled in suitable bearings at the opposite ends of a fixed front axle, and arranged to be steered in unison, either by lateral swinging of the tongue, where a tongue is employed, or manually, where such manual steering is provided for, and it should be understood that my invention contemplates steering in either way. In the accompanying drawings, however, I have illustrated my invention as incorporated in a manure spreader in which the dirigible front wheels are steered by means of a tongue, as steering in that way is more generally practiced.

Referring now to the drawings for an explanation of the spreader illustrated thereby, and particularly the means by which the above stated object of my invention is accomplished,—

Fig. 1 is a plan view of the forward portion of a spreader body, with some parts in section, showing the front axle, the front wheels, the draft connections, and the means by which the bed is shifted longitudinally of the tongue toward the outside of the turn when the wheels are swung laterally in either direction to steer the spreader. The relative position assumed by the parts when the wheels are so turned is indicated in dotted lines, which for convenience of illustration show endwise shifting of the axle from its full line position, with the bed in its initial position, rather than a shifting of the bed along the axle from its initial position. As will be made clear in the course of the following description, it is the bed that is shifted and not the axle, and Fig. 1 should be read with that understanding.

Fig. 2 is a front elevation of the spreader with the parts in the position shown in full lines in Fig. 1, the tongue and some of the adjacent parts being shown in transverse vertical section;

Fig. 3 is a horizontal section on line 3—3 of Fig. 2;

Fig. 4 is a vertical section on line 4—4 of Fig. 2;

Fig. 5 is a section on line 5—5 of Fig. 4;

Fig. 6 is a detail, being a partial plan view illustrating the connection between the tongue and the axle, together with the means for shifting the bed longitudinally of the axle when the tongue is swung laterally; and Fig. 7 is a section on line 7—7 of Fig. 1.

In the drawings I have shown only so much of the spreader as is necessary to a full understanding of my invention, and as to its general construction it will suffice to say that it comprises a rectangular box-like bed or load carrying body mounted on front and rear wheels and provided with any suitable form of equipment for delivering the manure at the rear. In the illustrated construction the bed is supported on sills 1 of channel iron, which are spaced apart the width of the bed and support the sides 2 thereof, which are usually made of boards. At the front the sills 1 are held in spaced relation to each other by an angle iron cross-member 3 secured to the sills and braced by gusset plates 4. The said sills are further braced with reference to the cross member 3 by rods 5, as best shown in Fig. 1. Usually the front end of the bed is provided with a rearwardly and downwardly inclined end wall 6 formed of cross boards which are secured to angle members 7 fastened to the sides 2, as best shown in Fig. 4. The bottom of the bed is provided with the usual endless apron 8 for feeding the manure to the distributing mechanism, such as a rotary beater. The front portion of said apron is shown in Fig. 1, and it may be mounted to travel over suitable supports carried by the bottom of the bed and driven by any preferred means carried at the rear of the spreader, to advance the load intermittently toward the beater mechanism.

The front end portions of the sides 2 are reinforced on the outside by means of upright straps 9, and on the inside they are provided with upright angle members 10 and 11 spaced apart, as best shown in Fig. 4, from which it will be seen that said uprights extend a considerable distance below the sills 1. Each upright 10 is secured to the cross-bar 3 by gusset plates 12, as shown in the latter figure, which gusset plates further serve to brace the sills 1 and the side members of the bed. Secured to each upright 11 is a plate 13 the purpose of which will be explained later. A wooden filler 14 is fitted in the forward portion of the channel of each sill 1 so that the parts which abut against the inner faces of said sills have a surface with which to engage. Said fillers also serve the purpose of spreaders for the rivets employed to secure the parts together.

The front portion of the bed is supported upon a front axle 15, which, as best shown in Figs. 4 and 7, is composed of two angle irons associated to form a hollow rectangular member with the marginal portions of their flanges in abutting engagement with each other. The outer portions of the axle are positioned between the pairs of uprights 10, 11 at points below the sills 1, as shown in Fig. 4.

At each end of the axle 15 is a wheel mounting comprising an arm 16 that is inserted in and secured to the end of the axle, said arm having an upright sleeve 17 in which is journaled the vertical pivot or shank 18 of a spindle, upon the horizontal portion of which is mounted a ground wheel 19. Preferably washers 20 are placed on each shank 18 above the sleeve 17, and pins 21 are provided to hold the spindle in place in the sleeve, as best shown in Fig. 2. As shown in Fig. 1, a steering arm 22 projects forwardly from each shank 18, each of which arms is pivotally connected at its forward end 23 with a steering rod or link 24 disposed transversely of the spreader. The inner ends of said links are provided with eyes which, as best shown in Figs. 2 and 7, are connected with a stud 25 secured to a transverse bracket 26 that forms part of a tongue support hereinafter referred to. The tongue 27 is pivotally mounted on a transverse horizontal pin 28 that is supported by angle members 29 that extend fore and aft and are spaced apart a sufficient distance to accommodate the rear end of the tongue between them, as shown in Fig. 1. The angle members 29 constitute a support for the tongue 27 and are braced and held in spaced relation by the bracket 26 and an upper bracket 30 that is preferably U-shaped, as shown in Figs. 2 and 7.

At their rear ends the angle members 29 are pivoted on a transverse horizontal pin 31 which is mounted in a transversely rocking member 32 pivotally connected, by a vertical pivot 33, with a head 34 that is secured by bolts 35 to the central portion of the front axle 15 and projects forward therefrom, as best shown in Fig. 7. The transverse pivot pin 28 makes it possible to raise and lower the front end of the tongue to suit horses of different size, and also permits the tongue to flex vertically when the spreader is traveling over rough ground or is crossing ditches. When the horses are disconnected from the tongue, and its front end rests on the ground, some pivotal action of the tongue supporting members 29 may occur about the pivot 31, but this hinge movement is limited because the ends of the bracket 26 are extended outward far enough to overlie the links 24, and, therefore, a reasonable degree of stiffness is provided for the tongue support under such circumstances. While the tongue can rise and fall with reference to its support, as above described, the tongue supporting members 29 provide a laterally rigid connection between the rear end portion of the tongue and the rocking member 32, so that when the front end of the tongue is swung to one side or the other for steering purposes the member 32 is caused to rock about its vertical pivot 33 and consequently the rear end of said member swings laterally in a direction opposite to that in which the front end of the tongue is moved. At the same time, through the connecting links 24 such lateral swinging of the tongue steers the front wheels so that they swing in the same direction as that in which the front end of the tongue is moved.

An important function of the rocking member 32 is to shift the bed longitudinally of the front axle, or laterally of the line of advance of the spreader, coincidently with the steering of the front wheels, but in the direction opposite to that in which the turn is being made, and the devices by which such result is accomplished will now be explained.

As best shown in Figs. 1 and 6, the rear portion of the rocking member 32 is in the form of a sector disposed in a horizontal plane, and provided at its rear margin with teeth 36 that are radial to the pivot 33 which constitutes the axis about which the rocking member 32 swings. The teeth 36 mesh with the teeth 37 of a rack bar 38 which is secured to the cross member 3 of the bed, preferably by means of a rivet 39, located near the middle of said rack bar, and rivets 40 which fasten the forward ends of the brace members 5 to the cross member 3, as best shown in Fig. 6. A rectangular plate 41, shown in Fig. 7, through which the rivets 39 and 40 pass, is preferably placed between the member 3 and the rack bar 38 to space the teeth of said rack bar a suitable distance from the axle 15, so that such teeth, which project forward and overlie the axle, will not bind thereupon when the bed is moved longitudinally of the axle. The rocking member 32 is preferably provided with a web 42 that overlies the teeth 36 and forms a cover or shield therefor, as shown in Fig. 7.

From the foregoing description it will be evident that inasmuch as the rack bar 38 is fixedly secured to the lower central portion of the bed, when the rocking member 32 is rocked in the manner above described, since said rocking member is supported on the pivot 33 which occupies a fixed relation to the front axle 15, the result will be that the bed will be shifted along the axle a distance corresponding with the swinging movement of the rear end portion of the member 32; also that since the rear end portion of the member 32 moves in a direction opposite to that in which the wheels are turned in steering, the bed will be shifted toward the outside of the turn that is being made, or away from the rear portion of the front wheel at the inner side of such turn. Consequently, notwithstanding the fact that the front portion of the bed is of full width, it is not undercut, and there is no danger of cramping even though the wheels be turned very sharply. The spreader may, therefore, make unusually short turns.

The bed is supported on the front axle 15 in such manner as to permit it to move easily longitudinally of the axle, while at the same time provision is made for transmitting the draft to the bed, and for permitting it to oscillate to a limited extent without interfering with the draft connections. As has been explained, the uprights or angle members 10, 11 extend below the body sills 1 and are spaced apart fore and aft to embrace the axle 15 between them, as best shown in Fig. 4. A bolt 43 extends through the lower ends of each pair of uprights below the axle 15, and mounted upon this bolt and between the members 10, 11 is a roller 44 that is adapted to cooperate with a transversely extending stop bracket or plate 45 that is secured to the under side of the axle, as best shown in Fig. 5. By this arrangement the amount of vertical oscillation permitted between the axle and the body is limited by the stop plates at the opposite sides of the spreader.

The bed or body of the spreader is supported upon the top face of the axle 15 by anti-friction rollers 46, shown in Figs. 1 and 5. Said rollers are preferably mounted on bushings 47 carried by bolts 48 that extend through the plates 12, 13, as best shown in Fig. 3, which bolts form axes for the rollers and serve also to secure the parts in place. The bushings 47 also function as spacers for the plates 12, 13.

The draft is transmitted from the front axle to the spreader bed by means of a U-shaped member 49, best shown in Fig. 7, which is secured to the rear face of the axle 15, midway of its length, by means of the bolts 35 which fasten the head 34 to the front axle. Said U-shaped member receives the downwardly extending flange of the angle iron cross member 3, as shown in Fig. 7, and these parts, together with the downwardly projecting portions of the uprights 10, 11 at the sides of the body, serve to transmit the draft to it from the axle. The rollers 44 and bolts 43, together with the stops 45, as previously described, limit the oscillation of the axle, or of the body, with respect to each other, and thereby prevent dislocation of the downwardly extending flange of the cross member 3 with respect to the recess formed by the U-shaped draft member 49.

As best shown in Fig. 1, double-trees 50 for the draft animals are mounted on the tongue 27. The draft force for advancing the machine is, therefore, transmitted through the pivot 28 to the angle members 29, which in turn transmit the draft through the pivot 31 to the toothed rocking member 32. Through the pivot 33 the draft is applied to the head 34 secured to the axle, and, as previously described, the draft is transmitted from the axle to the spreader body through the U-shaped member 49, the cross member 3, and the uprights 10, 11 secured to the side sills of the body. It will be apparent, therefore, that transverse movement of the front end of the body along the axle incident to steering the front wheels does not affect the transmission of the draft to the bed.

When the draft animals are guided to one side or the other, the tongue pivots about the vertical axis 33, and through the steering connections, comprising the links 24 and the steering arms 22, the front wheels are turned about the vertical axes composed of the sleeves 17 and shanks 18. As has been explained, the lateral movement of the front end of the tongue causes the rear end of the rocking member 32 to swing in the opposite direction about its pivot 33, and when this rocking occurs the teeth 36 of said rocking member act upon the teeth 37 of the rack 38 to shift said rack, and the spreader body to which it is attached, longitudinally of the axle. The result is that as the rear portion of the wheel on the inner side of the turn being made swings toward the body, the body automatically and simultaneously moves away from it, thereby making it possible to turn the machine in a relatively small arc, as has been explained. This shifting of the body along the axle is facilitated by reason of the body being supported on the front axle by the rollers 46. When the tongue is swung back to its normal position the body is, of course, automatically restored to its initial position midway between the ends of the axle.

By the construction described I am able to make the bed of full width and of uniform dimensions throughout, so that its capacity is not reduced, although the spreader may make very sharp turns. Furthermore, the bed may be so designed as to provide for proper distribution of the weight of the load between the front and rear wheels, and the front wheels may be spaced the proper distance apart to obtain the best results, since in spacing the wheels it is unnecessary to take turning requirements into account.

So far as I am aware, it is broadly new in the art to provide for shifting the front portion of the bed or body of a manure spreader, or machine of like character, longitudinally of the front axle, or transversely of the line of travel of the machine, to accommodate the angling of the front steering wheels in making a turn, whether the wheels be steered by the use of a tongue or in any other way; also to provide for transmitting the draft to the bed or body of the machine from a front axle along which the bed is shifted without disturbing the draft connections. Particularly in these respects, therefore, my invention is generic in character, and the claims hereinafter made are to be construed accordingly. Furthermore, it should be understood that while I have described in detail the structure which I have chosen to illustrate in the drawings as a desirable form for the embodiment of my invention, by so doing I have not intended to limit my invention to the specific construction shown and described, as various modifications coming within the scope of the appended claims will readily occur to those familiar with the art. While the spreader illustrated is shown as provided with a tongue carrying double-trees, so that it may be drawn by horses, the spreader may obviously be drawn by a tractor, and instead of providing a tongue for steering purposes, the spreader may be steered in any other suitable way.

What I claim as my invention and desire to secure by Letters Patent, is—

1. The combination with a load carrying bed, of dirigible wheels supporting one end portion thereof, said wheels being mounted to turn about vertical pivots at opposite sides of the bed, for steering purposes, and means operable to move said end portion of the bed toward one or the other of said vertical pivots, coincidently with the steering of said wheels and in a direction opposite to that in which the wheels are steered, said pivots at all times remaining in a line substantially parallel with the end portion of the bed.

2. The combination with a load carrying bed, and dirigible wheels supporting one end portion thereof, said wheels being mounted to turn about vertical pivots at opposite sides of the bed, for steering purposes, of means operable to steer said wheels, and means actuated by the operation of said steering means to move said end portion of the bed toward one or the other of said vertical pivots, and in a direction opposite to that in which the wheels are steered, said pivots at all times remaining in a line substantially parallel with the end portion of the bed.

3. The combination with a load carrying bed, an axle in fixed angular relation to the bed and supporting one end portion thereof, and wheels carried by said axle to turn laterally relatively thereto for steering purposes, of means operable to steer said wheels and coincidently shift the bed longitudinally upon the axle in a direction opposite to that in which the wheels are steered.

4. The combination with a load carrying bed, an axle supporting one end portion thereof for movement longitudinally of the axle, and dirigible wheels pivotally connected with the end portions of the axle to turn laterally relatively thereto, of means operable to steer said wheels, and means actuated by the operation of said steering means to move the bed longitudinally of the axle in a direction opposite to that in which the wheels are steered.

5. The combination with a load carrying bed, and dirigible wheels supporting one end portion thereof, said wheels being mounted to turn about vertical pivots at opposite sides of the bed for steering purposes, of a tongue movable laterally to steer said wheels, and means actuated by lateral movement of the tongue to move said end portion of the bed laterally in a direction opposite to that in which the wheels are steered, said pivots at all times remaining in a line substantially parallel with the end portion of the bed.

6. The combination with a load carrying bed, an axle in fixed angular relation to the bed and supporting one end portion of the bed, and dirigible wheels pivotally connected with the end portions of the axle to turn laterally relatively thereto for steering purposes, of a tongue connected with the axle and movable laterally to steer said wheels, and means actuated by lateral movement of the tongue to move said end portion of the bed longitudinally of the axle in the opposite direction.

7. The combination with a load carrying bed, dirigible wheels supporting one end portion thereof, said wheels being mounted to turn about vertical pivots at opposite sides of the bed, for steering purposes, draft devices, and means for transmitting the draft to the bed, of means operable to steer said wheels, and coincidently move said end portion of the bed laterally in a direction opposite to that in which the wheels are steered, said pivots at all times remaining in a line parallel with the end portion of the bed.

8. The combination with a load carrying bed, an axle in fixed angular relation to the bed and supporting one end portion thereof, and wheels carried by said axle to turn laterally relatively thereto for steering purposes, of means operable to steer said wheels, draft devices, means for transmitting the draft to the bed, and means actuated by said steering means to move said end portion of the bed longitudinally of the axle in a direction opposite to that in which the wheels are steered.

9. The combination with a load carrying bed, an axle in fixed angular relation to the bed and supporting one end portion thereof, and dirigible wheels pivotally connected with the end portions of the axle to turn laterally relatively thereto for steering purposes, of means operable to steer said wheels, means actuated by the operation of said steering means to move the bed longitudinally of the axle in a direction opposite to that in which the wheels are steered, draft devices, and means for transmitting the draft to the bed.

10. The combination with a load carrying bed, an axle in fixed angular relation to the bed and supporting one end portion thereof, and dirigible wheels pivotally connected with the end portions of the axle to turn laterally relatively thereto for steering purposes, of means operable to steer said wheels, means actuated by the operation of said steering means to move the bed longitudinally of the axle in a direction opposite to that in which the wheels are steered, draft devices connected with the axle, and means for transmitting the draft from the axle to the bed.

11. The combination with a load carrying bed, an axle in fixed angular relation to the bed and supporting one end portion of the bed, and dirigible wheels pivotally connected with the end portions of the axle to turn laterally relatively thereto for steering purposes, of a tongue connected with the axle to swing laterally with respect thereto, means operated by lateral swinging of the tongue to steer said wheels and coincidently move said end portion of the bed laterally in a direction opposite to that in which the front end of the tongue swings, draft devices, and means for transmitting the draft to the bed.

12. The combination with a load carrying bed, an axle supporting one end portion of the bed, and dirigible wheels pivotally connected with the end portions of the axle to turn laterally relatively thereto, of a tongue pivotally connected with the axle to swing laterally with respect thereto, means actuated by lateral swinging of the tongue to steer said wheels and coincidently move the bed longitudinally of the axle in a direction opposite to that in which the front end of the tongue swings, draft devices carried by the tongue, and means for transmitting the draft to the bed.

13. The combination with a load carrying bed, a front axle in fixed angular relation to the bed, rollers interposed between the front end portion of the bed and said axle, and dirigible wheels pivotally connected with the end portions of the axle to turn laterally relatively thereto, of means operable to steer said wheels and coincidently move said end portion of the bed laterally in a direction opposite to that in which the wheels are steered, draft devices connected with the axle, and means for transmitting the draft to the bed.

14. The combination with a load carrying bed, an axle in fixed angular relation to the bed and supporting one end portion thereof for movement longitudinally of the axle, and dirigible wheels pivotally connected with the end portions of the axle to turn laterally relatively thereto, of means operable to steer said wheels, means actuated by the operation of said steering means to move the bed longitudinally of the axle, draft devices connected with the axle, and a transversely shiftable draft connection between the axle and the bed for transmitting the draft to the bed.

15. The combination with a load carrying bed, an axle in fixed angular relation to the bed and supporting one end portion thereof for movement longitudinally of the axle, and dirigible wheels pivotally connected with the end portions of the axle to turn laterally relatively thereto, of means operable to steer said wheels, means actuated by the operation of said steering means to move the bed longitudinally of the axle, draft devices connected with the axle, and draft connections between the front portion of the bed and the axle comprising inter-engaging members carried respectively by the bed and by the axle and arranged to slide relatively to each other longitudinally of the axle.

16. The combination with a load carrying bed, an axle in fixed angular relation to the bed and supporting one end portion of the bed, and dirigible wheels pivotally connected with the end portions of the axle to turn laterally relatively thereto, of a tongue pivotally connected with the axle to swing laterally with respect thereto, a rack carried at the rear end of said tongue, a rack connected with the front portion of the bed and meshing with said first mentioned rack, and means actuated by lateral swinging of the tongue to steer said wheels.

17. The combination with a load carrying bed, an axle in fixed angular relation to the bed and supporting one end portion thereof, and dirigible wheels pivotally connected with the end portions of the axle to turn laterally relatively thereto, of a rocking member pivotally connected with the central portion of the axle to swing laterally, a rack carried by said member, a rack bar connected with the front portion of the bed and meshing with said rack, and means operable to steer said wheels and coincidently rock said rocking member to move the bed longitudinally of the axle in a direction opposite to that in which the wheels are steered.

18. The combination with a load carrying bed, an axle in fixed angular relation to the bed and supporting one end portion thereof, and dirigible wheels pivotally connected with the end portions of the axle to turn laterally relatively thereto, of a rocking member pivotally connected with the central portion of the axle to swing laterally, a rack carried by said member, a rack bar connected with the front portion of the bed and meshing with said rack, a tongue connected with said rocking member for rocking the same, and means actuated by lateral swinging of the tongue to steer said wheels.

19. The combination with a load carrying bed, an axle in fixed angular relation to the bed and supporting one end portion thereof, and dirigible wheels pivotally connected with the end portions of the axle to turn laterally relatively thereto, of a rocking member pivotally connected with the central portion of the axle to swing laterally, a rack carried by said member, a rack bar connected with the front portion of the bed and meshing with said rack, a tongue having a laterally rigid connection with said rocking member, and connections between said wheels and the tongue for steering said wheels by lateral swinging of the tongue.

20. The combination with a load carrying bed, an axle supporting one end portion thereof, and dirigible wheels pivotally connected with the end portions of the axle, of a head connected with and projecting forward from the central portion of said axle, a rocking member pivotally supported by said head to swing laterally and having a rack disposed rearwardly of such pivotal support, a rack bar connected with the front portion of the bed and meshing with said rack, a tongue having a laterally rigid connection with said rocking member, and means connecting said tongue with said wheels for steering the same by lateral swinging of the tongue.

21. The combination with a load carrying bed, an axle in fixed angular relation to the bed and supporting one end portion thereof, and dirigible wheels pivotally connected with the end portions of the axle to turn laterally relatively thereto, of a tongue pivotally connected with the axle to swing vertically and laterally, means connecting the tongue with said wheels for steering the same, and means actuated by lateral swinging of the tongue to move the bed longitudinally of the axle in a direction opposite to that in which the wheels are steered.

22. A vehicle comprising a load carrying bed, a front axle in fixed angular relation to the bed and supporting the front portion thereof, dirigible wheels carried by the axle and adapted to be turned laterally for steering, means operable to steer said wheels, and means actuated coincidently with the steering of the wheels to shift the front portion of the bed longitudinally of the axle in a direction opposite to that in which the wheels are steered.

23. A vehicle comprising a load carrying bed, a front axle in fixed angular relation to the bed and supporting the front portion thereof, dirigible wheels carried by the axle and adapted to be turned laterally for steering, means operable to steer said wheels, and means connected with said steering means and actuated thereby to shift the front portion of the bed longitudinally of the axle in a direction opposite to that in which the wheels are steered.

LEONARD B. NEIGHBOUR.